United States Patent Office 3,288,693
Patented Nov. 29, 1966

3,288,693
METHOD FOR AUTOMATICALLY CONTROLLING ELECTRODE DEVICE FEEDING IN ELECTRIC EROSION MACHINES AND AN ARRANGEMENT TO CARRY OUT THIS METHOD
Abram Lazarevich Livshits, Moscow, U.S.S.R., assignor to Experimentalny Nauchno-Issledovatelsky Institute Metallorezhushtchikh Stankov
Filed July 30, 1963, Ser. No. 298,771
4 Claims. (Cl. 204—143)

The present invention relates to methods of automatically controlling electrode device feeding in electric erosion machines by determining the optimum speed of feeding and ensuring the maximum efficiency of the machine, and also to arrangements for carrying out said method.

I acknowledge that prior to my invention, there existed other methods for automatically controlling the speed of the electrode device feeding independent of the electric parameters in electric erosion treatment, there were known arrangements for automatically controlling the speed of feeding, which comprised a measuring circuit for measuring and transforming the signal in proportion to the current and voltage in the circuit of the electrode and the work, and a final control unit for altering the speed of electrode feeding.

The disadvantage of the previous methods in solving the task of ensuring optimum speed of electrode feeding in agreement with the maximum efficiency, is inconsistency in eliminating disturbances caused by current flow outside the operating zone and therefore the establishment of the false optimum feeding speed disagreeing with the maximum efficiency.

Consequently, I do not claim a method in which the speed of the electrode is established independent of the electric parameters of the electric erosion process, and an arrangement comprising a measuring circuit for measuring and transforming the signal, and a final control unit for altering the speed of electrode feeding, but I do claim a method for automatically controlling the feed of the electrode device in electric erosion machines, supplied by generators characterized by independent pulse shaping, wherein for obtaining the maximum efficiency, the optimum feeding speed is established in accordance with the minimum pulses of the no-load run voltage, short-circuit current pulses and false pulses caused by current flow outside the operating zone. I do also claim an arrangement for carrying out this method comprising a measuring circuit for measuring and transforming the signal proportional to the current and voltage in the circuit of the electrode and the work, and a final control unit to control the programmer of the main regulator, which establishes the speed of the electrode device feeding, furthermore, the measuring circuit comprises devices to limit current and voltage signals in amplitude, for instance, a stabilitron, and in width, for instance a triggered multivibrator, and an emitting repeater which is governed by signal pulses limited in amplitude and width, and intended to control a three-position relay, which governs the final control unit of the regulator programmer, and a three-position polarized relay (or a non-linear element of any other type), which switches in the final control unit of the regulator programmer to retract the electrode from the work upon a reduction of the voltage in the erosion gap below the pre-established or predetermined value and disconnect it upon an increase of said voltage above the pre-established value.

An object of the present invention is to ensure a maximum efficiency for electric erosion treatment of metals.

Another object of the present invention is to eliminate the influence of disturbances on the control process of the optimum speed of electrode device feeding in machines used for electric erosion processes.

In connection with the above and other objects the invention is contemplated as a novel arrangement and combination of parts and units of a construction, which is hereinafter disclosed and submitted in the claims, and it will be understood that in the close embodiment of the invention disclosed hereinafter modifications are possible within the claimed scope without departing from the spirit of the invention.

Other objects and advantages will be made understood from the following detailed description and the appended drawings, in which.

Figure 1:
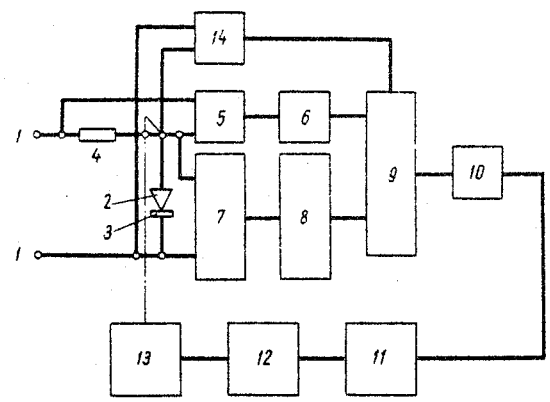
FIG. 1 shows a structural diagram of the first variant of controlling electrode device feeding in electric erosion machines.

The pulse generator is connected to terminals 1 and sends supply to electrode device 2 and work 3 thru resistance 4. Current pulses across resistance 4 are adjusted to the pre-established value by limiting amplitude 5, and are adjusted in width by shaping arrangements 6.

Similarly, voltage pulses across the erosion gap are limited in amplitude by limiter 7 and are adjusted in width by shaping arrangement 8.

For limiting current and voltage pulses in amplitude stabilitrons and other similar devices may be utilized. For adjusting pulses in width, arrangements of the triggered multivibrator type may be used.

Current and voltage pulses shaped in the above manner arrive at logical arrangement 9, which defines the direction of signal alteration so that with a majority of voltage pulses in no-load operation a signal is generated to draw the electrode to the work, with a majority of short-circuit current pulses a signal is produced to withdraw the electrode, and with minimum voltage pulses in no-load operation and short-circuit current pulses the signal is unaltered and corresponds to the optimum speed of electrode feeding.

The logical device operates in the following manner:

In operation at the optimum electrode feeding speed the measuring circuit is supplied with a current and voltage signal. Operated by this signal, logical device 9 generates a signal to stop electric motor 10 of the drive of automatic potentiometer 11, connected in the signal adjustment circuit of the programmer in main regulator 12, which sends a signal to final control electric motor 13, which moves electrode 2.

Upon contact of the electrode with the work, logical device 9 receives only a current signal. Operated by this signal, logical device 9 sends a signal to automatic potentiometer 11 to alter the adjustment and to withdraw the electrode from the work.

In no-load operation the logical device is supplied only with a voltage signal. Operated by this signal, logical device 9 sends a signal to automatic potentiometer 11 to alter the adjustment and to draw the electrode to the work.

Upon disconnection of the control system, the logical device receives neither current signals, nor voltage signals.

The logical device can be represented, for instance, by a trigger governed by signal pulses which are limited in amplitude and width, said signal being proportioned to the current and voltage in the circuit of the electrode and the work.

Non-linear element 14, for instance, a polarized three-position relay, operates at voltage reduction in the erosion gap below the pre-established value, which corresponds to the minimum distance between the electrode and the work and which has not yet caused short-circuit. Simultaneously, the electric motor of automatic potentiometer 11 is switched on and a signal is generated to withdraw the electrode from the work. Upon a rise of the voltage in the erosion gap above the pre-established value, non-linear element 14 disconnects the electric motor of automatic potentiometer 11 and its further operation goes on under the effect of current and voltage signals arriving at logical device 9.

Figure 2:
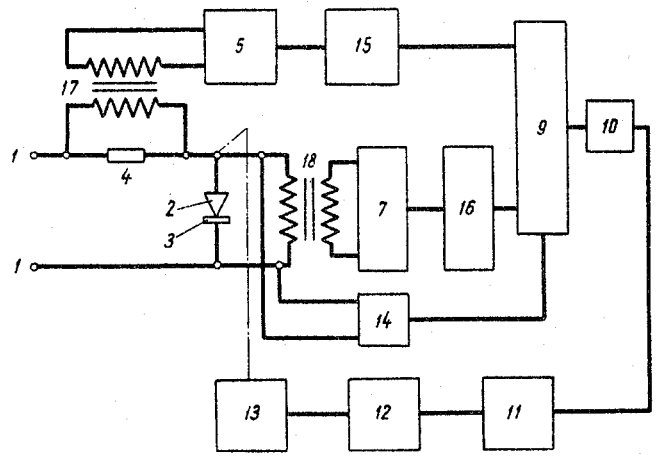
FIG. 2 shows a structural diagram of another variant of control.

Another variant of the control circuit, shown in FIG. 2, is characterized in that the arrangement shaping the pulse width, has been substituted by filters 15 (for a current circuit) and 16 (for a voltage circuit), used for filtering signal pulses so as to abolish intervals between pulses and ensure a constant voltage at the output.

In this case signals may be transmitted thru current transformer 17 and voltage transformer 18.

Figure 3:
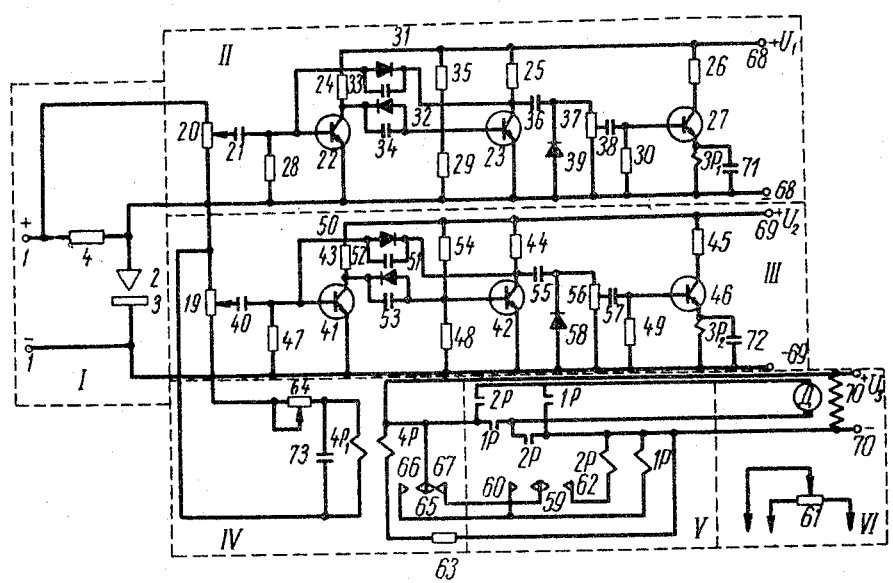
FIG. 3 shows a schematic electric diagram of the proposed invention.

In FIG. 3 the schematic electric diagram of the proposed arrangement comprises operating current circuit I, current pulse shaping block II, voltage shaping block III, block IV for adjusting the gap between the electrode and the work, block V of logical cells, and block VI of the automatic potentiometer.

The terminals of operating current circuit I are connected to the independent pulse generator, whose voltage is supplied to electrode 2 and work 3 thru current limiting resistance 4. Electrode 2 and work 3 form an erosion gap, wherein the metal is removed off the work in operation.

From the erosion gap, the voltage arrives at block III, which shapes voltage pulses, thru resistance divider 19, and from current limiting resistance 4 to block II, which shapes current pulses, thru resistance divider 20. Dividers 19 and 20 assist in adjusting the required amplitude of input signals.

Current pulse shaping block II and voltage pulse shaping block III are similar in design and principle of operation. Each block comprises a triggered multivibrator (a trigger with one stable state) and an emitting repeater.

Block II functions in the following manner: From divider 20 the input signal arrives thru capacitor 21 at the base of triode 22, which is combined with triode 23 to form a resistance multivibrator (a trigger with one stable state). Resistances 24, 25 and 26 provide loads for triodes 22, 23 and 27. Resistances 28, 29 and 30 are leakage resistances of the bases of respective triodes.

Stabilitrons 31 and 32 are used in the trigger circuit as transient elements, which limit the pulse amplitude, they are shunted by capacitors 33 and 34. The displacement value is supplied to the base of triode 23 thru resistances 35 and 29.

In the initial position triode 23 is opened and triode 22 is closed. A positive input pulse opens triode 22. Its collector produces a negative signal which arrives at the base of triode 23 thru the limiting circuit 32, 34. The collector of triode 23 produces a positive signal, which is sent to the base of triode 22 thru the other limiting circuit 31, 33. The positive feedback functions until capacitors 33 and 34 are charged, following which the circuit returns to the initial position and is ready to receive another initiating pulse.

The width of the pulse is defined by the value of transient capacitors 33 and 34 and the amplitude is defined by stabilitrons 31 and 32.

From the resistance multivibrator, the shaped signal arrives at the input of emitting repeater 27 thru capacitor 36 and divider 37. The signal is controlled at the input by divider 36, and thru transient capacitor 38 arrives at resistance 30 and at the base of triode 27. Diode 36 cuts off the negative peak of the back front of the pulse which is due to transient phenomena in the trigger.

Block III, which shapes voltage pulses, functions similarly to block II. From divider 19 the input signal, thru capacitor 40, arrives at the base of triode 41, which is combined with triode 42 to form a resistance multivibrator. Resistances 43, 44 and 45 provide loads for triodes 41, 42 and 46. Leakage resistances 47, 48 and 49 are connected to the bases of respective triodes. For limiting pulses in amplitude the trigger circuit comprises stabilitrons 50 and 51, which are shunted by capacitors 52 and 53. The displacement value is supplied to the base of triode 42 thru resistances 54 and 48.

In the initial position triode 42 is opened and triode 41 is closed. The positive input pulse opens triode 41, whose collector generates a negative signal which is sent to the base of triode 42 thru the limiting circuit 51, 53. The collector of triode 42 produces a positive signal, which arrives at the base of triode 41 thru the other limiting circuit 50, 52. The positive feedback functions until capacitors 52 and 53 are charged, following which the circuit returns to the initial position and is ready to receive another initiating pulse. The pulse width is defined by capacitors 52 and 53, and the amplitude is defined by stabilitrons 50 and 51. The signal shaped in the resistance multivibrator arrives at the input of emitting repeater 46 thru capacitor 55 and divider 56. The signal at the output of said repeater is controlled by divider 56 and thru transient capacitor 57 arrives at resistance 49 and the base of triode 46. Diode 58 cuts off the negative peak of the back front of the pulse caused by the transient phenomena in the trigger.

The polarized three-position relay 3P with windings $3P_1$ and $3P_2$ and two intermediate relays 1P and 2P are used as logical cells (block V).

Winding $3P_1$ is connected to the output of block II shaping current pulses, and winding $3P_2$ is connected to the output of block III shaping voltage pulses.

With a short-circuit in the erosion gap, the signal is supplied only to block II shaping current pulses and arrives at winding $3P_1$ of the relay. The armature of relay 3P attracts and closes contacts 59 and 60. At this time intermediate relay $1P_1$ operates and its contacts 1P close the supply circuit of the final control motor D comprising an independent excitation winding O. The final control motor D moves the slide of potentiometer 61, comprised by the circuit of the programmer of the main regulator in the direction ensuring the reduction of the speed of electrode feeding and increase of the erosion gap.

In no-load running the signal arrives only at the input of block III shaping voltage pulses. At this time winding $3P_2$ of relay 3P operates, the relay armature closes contacts 59–62 and switches in the winding of intermediate relay 2P. The contacts of relay 2P switch on the final control motor D, which moves the slide of potentiometer 61 in the direction ensuring a higher speed of electrode feeding and reducing the gap between the electrode and the work.

In operation with an optimum gap between the electrode and the work the input signal arrives at block II and block III. Simultaneously, the two windings $3P_1$ and $3P_2$ of relay 3P are energized while contact 59 remains in the neutral position. The slide of potentiometer 61 remains in a position coinciding with the optimum speed of the electrode device feeding.

Gap adjustment block IV is intended to prevent a possible long operation of the machine with a small gap between the electrode and the work. In the case of small gaps, due to incidental carbonized particles as products of pyrolysis of the working liquid in the gap the measuring circuit may receive false current and voltage pulses caused by current flow thru said particles, when metal is not removed from the work in operation. In the presence of false signal pulses block II and block III operate, while the final control unit is not switched on and the speed of electrode feeding is not altered. This mode of operation is not to be tolerated.

Gap adjustment block IV comprises a three-position polarized relay 4P. Winding $4P_2$ of said relay is energized by an independent power source thru resistance 63 arranged during mounting operations. Another winding $49_1$ become less than the ampereturns or winding $4P_2$, erosion gap thru the controlled resistance 64.

In the case of small gaps between the electrode and the work the voltage of the erosion gap drops, for instance, down to 10 volts; and the ampereturns of winding $4P_1$ become less than the ampereturns of winding $4P_2$, and slide contact 65 closes on contact 66. The final control motor D, independently of block V of logical cells, is switched in to move the slide of potentiometer 61 in the direction corresponding to the reduction of the electrode feeding speed. Consequently, the gap between the electrode and the work is growing wider, and the voltage in the erosion gap is rising. With a certain value of voltage in the erosion gap the ampereturns of winding $4P_1$ will be more than the ampereturns of winding $4P_2$, and sliding contact 65 will abandon contact 66 and will close on contact 67. The final control motor D is again connected to block V of logical cells and will be operated by signals arriving at block II and block III.

Terminals 68 of block II, which shapes current pulses, terminals 69 of block III, which shapes voltage pulses and terminals 70 of block VI of the automatic potentiometer are connected to respective D.C. sources.

Potentiometer 61 is connected to the main regulator which controls the speed of electrode device feeding.

Capacitors 71, 72 and 73 serve to smooth out the pulsation on the respective windings of the relay.

The proposed method for automatically controlling the feed of an electrode device and arrangement for carrying out this method ensure the operation of electric erosion machines for achieving maximum efficiency. The utilization of this method and arrangement produce a great economic effect.

Although the present invention has been described in connection with the preferable modification it will be understood that modifications and variants may occur without departing from the spirit and scope of the invention, which will be readily understood by those skilled in the art.

These modifications and variants are considered to be within the idea and scope of the invention and the appended claims.

What I claim is:

1. A method for optimal automatic control of electrode tool feeding in electric erosion machines, powered by a generator circuit, through electrical pulses derived from the generator circuit supplying the tool-to-load gap comprising the steps of: deriving electric pulses in accordance with the spacing of the tool-to-work with respect to minimum no-load voltage pulses for spacings greater than a predetermined minimum spacing, no-gap short circuit current pulses, and optimal spacing pulses, independently shaping said electrical pulses, detecting by digital logic which type spacing pulses are being developed, and controlling the tool feeding in accordance with the type pulses being detected whereby the optimal speed of electrode tool feeding in the machine is established in accordance with the minimum no-load voltage pulses, short circuit current pulses and optimal pulses.

2. A method for optimal automatic control of electrode tool feeding in electric erosion machines, powered by a generator circuit including a resistor in series with the tool-to-work gap, outside of the operating gap zone, across which resistor electrical pulses are developed in accordance with the tool-to-load gap spacing comprising the steps of: deriving current pulses across the resistor; deriving voltage pulses across the erosion gap; filtering said pulses, limiting said pulses in amplitude; detecting by digital logic the filtered and limited pulses relative to predetermined maximum and minimum levels; and controlling the gap and tool feeding in accordance with said pulses with respect to the current pulses thereof, the voltage pulses thereof, and the combination of said pulses.

3. An apparatus for optimal automatic control of electrode tool feeding in electric erosion machines supplied by a source, comprising a current limiting resistance, means for deriving electric pulses therefrom, amplitude and width pulse limiters connected to the deriving means, a digital logic means responsive to the deriving means to receive electric pulses after they have been limited in amplitude and width and produce signals indicative thereof, an automatic resistance potentiometer, an electric motor for varying the potentiometer resistance under control of signals from said logical means, a programmer for feeding the electrode tool in accordance with said potentiometer resistance, and a non-linear element responsive to voltage drop across the electrode tool below a predetermined minimum value for controlling said motor of said automatic potentiometer.

4. An apparatus for optimal automatic control of electrode tool feeding in electric erosion machines supplied from an independent source, comprising a current limiting resistance in circuit with said source across which electric pulses are developed, electric filters connected to independently receive said pulses, pulse amplitude limiters connected to the filters, a digital logic means connected to the limiters for receiving electric pulses after they have passed through the filters and amplitude limiters, an automatic potentiometer, an electric motor for driving a potentiometer to vary its resistance, connections from a logical means to said motor for control thereof by the signals from said logical means, and a programmer circuit for electrode tool feeding comprising said limiters.

References Cited by the Examiner

UNITED STATES PATENTS

| | | | |
|---|---|---|---|
| 2,717,326 | 9/1955 | Gunton | 314—69 |
| 2,809,319 | 10/1957 | Steele et al. | 314—69 |
| 2,960,690 | 11/1960 | Curtis | 318—478 |
| 3,097,252 | 7/1963 | Robinson | 13—13 |

JOHN H. MACK, *Primary Examiner.*

R. K. MIHALEK, *Assistant Examiner.*